April 15, 1930.   A. L. MENZIN   1,754,478

STEAM SEPARATOR

Filed May 22, 1926

INVENTOR:
Abraham L. Menzin
By E. J. Andrews
ATTORNEY.

Patented Apr. 15, 1930

1,754,478

UNITED STATES PATENT OFFICE

ABRAHAM L. MENZIN, OF SAN FRANCISCO, CALIFORNIA, ASSIGNOR, BY DIRECT AND MESNE ASSIGNMENTS, TO BLAW-KNOX COMPANY, OF BLAWNOX, PENNSYLVANIA, A CORPORATION OF NEW JERSEY

STEAM SEPARATOR

Application filed May 22, 1926. Serial No. 111,078.

This invention relates to improvements in fluid receivers, and has for its object the production of means for more perfectly distributing the flow of fluids into fluid receivers. This application is directed particularly towards fluid separators and the purpose of the invention as herein described is to assist in eliminating all of the impurities from the gas, such as oil or water vapor, which flows into the separator, by maintaining the speed of the gas sufficiently low as it passes through the purifying means of the separator. A further object is to properly distribute the gas so that it will pass through all portions of the purifying means as nearly as possible at the same speed, and thus to increase the capacity of the separator.

Figure 1:
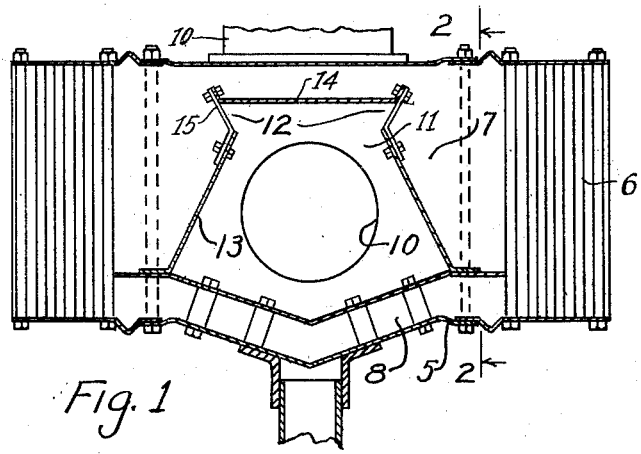
Figure 2:
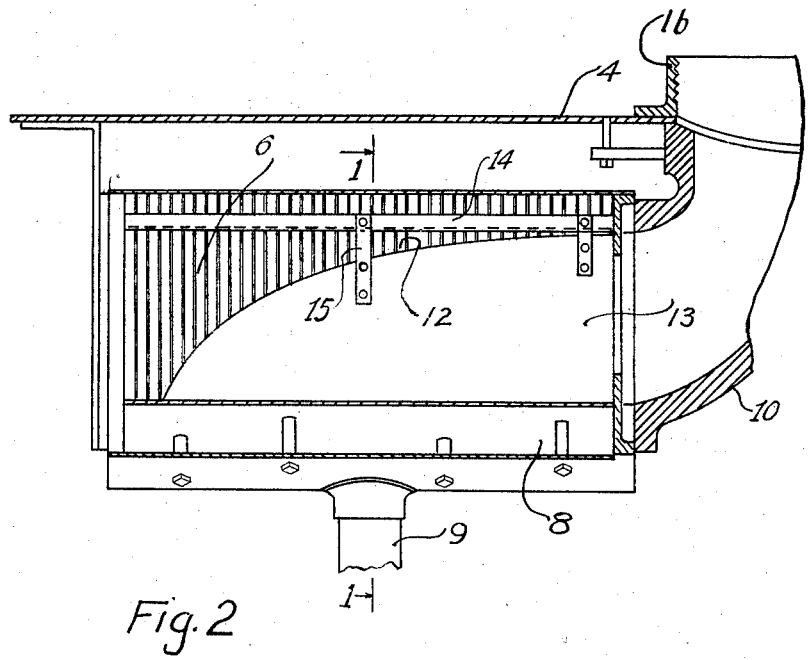

Fig. 1 is a transverse section of a separator along the line 1—1 of Fig. 2 which embodies the features of my invention; Fig. 2 is a longitudinal section along the line 2—2 of Fig. 1 but with the outlet of the separator also in section.

Although I have herein illustrated and described a steam separator, or purifier, as embodying my invention, yet it is to be understood that the invention is applicable to the distribution of any fluids, such as gases or air, as they pass through elongated inlets into rooms, or receivers of any nature, as well as to the separation or purification of any fluids. And the term separator or purifier as used herein is intended to refer to any suitable form of separator, or purifier, wherein impurities such as liquid or solid particles are separated from the gas or vapors which it is desired to purify.

As is well understood, in order to separate impurities such as moisture and solid particles from the steam, it is common to pass the steam, on its way from the interior of the boiler to the steam pipes of the boiler system, through a purifier or separator. The purifier ordinarily comprises some form of baffles through which the steam must pass, and the baffles are so arranged that while the steam itself will pass around them, yet the impurities, such as moisture, will be retained and pass back into the boiler or will be drained outside of the boiler, as conditions may warrant.

The apparatus which I prefer herein to illustrate my invention comprises a casing 5 with one end closed and in the sides of which are mounted systems of baffles 6. The separator, when in use, is ordinarily mounted with a boiler 4, and the steam passes through the baffles 6 into the chamber 7 of the purifier; and then, ordinarily, the steam passes through an outlet 10 out of the boiler into the steam main 16 of the system. As the steam passes through the baffles the moisture therein is stopped in its flow by the baffles and it runs downwardly into the passageway 8 and thence through a pipe 9 to any point to which it is desired to discharge the liquid; and the liquid carries with it other impurities such as solid particles which were contained in the steam.

I have found, however, that if the speed of the steam through the baffles is too great the separation of the moisture from the steam will be imperfect, as there is more or less of a tendency of the moisture, owing to spattering or otherwise, to rebound from the baffle surfaces and to be carried along with the steam. With longitudinal separators having an outlet at one end, the steam entering adjacent the outlet end passes through the baffles frequently at too high a speed, and, at the same time, the steam entering at remote points may pass through the baffles at unnecessarily low speeds.

Therefore, in order to properly distribute the steam so as to cause it to pass through the baffles at all portions of the separator at substantially uniform speeds which are sufficiently low, I provide means for obstructing the flow more and more as the outlet is approached, and I thus increase the resistance to the flow as the outlet is approached at such rate as to reduce the speed near the outlet without reducing the speed at more remote points materially below the speed near the outlet. Any suitable means may be used for producing such a resistance to the flow of the steam. In this instance I prefer to provide means within the chamber 7 so arranged that the resistance to the flow from this chamber to the outlet increases at such a rate as the outlet is approached as to cause the steam to flow at substantially uniform rates through the baffles throughout the entire length of the separator.

For this purpose I provide in this instance a passageway 11 running longitudinally within the chamber 7 and connecting with the chamber 7 by openings or slots or inlets 12, the cross section of which decreases gradually as the outlet is approached. In this instance I provide such openings by cutting off the upper edges of the side plates 13 of the chamber 11, and supporting the top wall 14 by means of straps 15, or in any other suitable manner.

The inlets 12 allow the steam to flow from the chamber 7 to the passageway 11, and thus from the baffles to the steam outlet 10, and the shape of these inlets determines the relative flow through the baffles. I have found that, in order to produce substantially uniform flow through all portions of the baffles, or at least all portions in the same horizontal plane, the inlets must increase very rapidly in width as the closed end of the separator is approached. In fact, I have found that the end of the inlets adjacent the closed end of the separator should be as wide as possible, so that the sides 13 should be entirely cut away at this end. And that then the decrease in width as the outlet 10 is approached at first should be much greater than the decrease in distance from the outlet; so that the inlets should have lower edges curved somewhat as indicated. But adjacent the outlet end the curve becomes nearly a straight line. I prefer to have these lower edges of the inlets approximate conic section curves. And a similarly shaped inlet is preferable even though no purifying means are used, provided the outlet of the gas receiver is adjacent one end thereof.

It will be understood, however, that the exact shape of the inlets will depend upon certain conditions, such as the relative length and height of the separator, and that the upper edges of the inlets also may be curved. In general, however, I prefer inlets in which the width of the end adjacent the outlet 10 is relatively very small, and the other end would be substantially infinite if the structure permitted, being in practice as wide as the structure allows. And to compensate for the limitations of the structure I prefer to have these ends of the inlets full width for a material distance from the end of the separator, as indicated.

I claim as my invention:

1. A fluid separator including a passageway, said passageway having a fluid outlet and a fluid inlet, said inlet comprising an elongated opening, the width of said opening varying from one end to the other end at a rate unlike the rate of change of the distance from either end.

2. A fluid separator including an elongated passageway having a fluid outlet at one end, and an elongated fluid inlet extending from adjacent said end a material distance towards the other end, the rate of change in width of the inlet varying at a different rate than the rate of change of distance from the end of said inlet adjacent said outlet.

3. A gas purifier comprising an elongated casing having a gas outlet adjacent one end and a gas inlet extending along one side of said casing, purifying means mounted adjacent said inlet, and means for retarding the flow of gas mounted between said inlet and said outlet, said means comprising plates forming an inner passageway, some of said plates having an elongated slot therein, the slot varying in width as it recedes from one end, the rate of change in said width being unlike the rate of change of the distance from said end.

4. A fluid receiver including an elongated passageway having an outlet near one end, and a fluid inlet extending substantially from one end to the other thereof, one edge of said inlet curving from one end to the other, the curve of said curved edge being substantially a conical section.

5. A gas purifier comprising an elongated casing having a gas outlet adjacent one end and a gas inlet extending along one side of said casing, said casing having purifying means mounted therein, and means for retarding the flow of gas mounted in said casing, said means comprising plates forming an inner passageway, the upper edge of the side plates of said passageway being spaced away from the top, thus forming slots on each side, each of the slots varying in width as it recedes from one end, the rate of change in said width being unlike the rate of change of the distance from said end.

6. A gas purifier comprising an elongated casing having a gas outlet adjacent one end and a gas inlet extending along one side of said casing, said inlet having purifying means mounted therein, and means for retarding the flow of gas mounted in said casing, said means comprising plates forming an inner passageway, some of said plates having an elongated slot therein, the slot varying in width as it recedes from one end, the rate of change in said width being unlike the rate of change of the distance from said end, said slot at one end extending from the upper to the lower portion of said passageway.

7. A fluid separator comprising an elongated casing having a gas outlet remote from one end and a gas inlet extending along one side of said casing, said inlet having separating baffles mounted therein, and means for retarding the flow of steam mounted in said casing, said means including a plate extending substantially vertically adjacent the inner side of said baffles with the end portion adjacent said outlet extending substantially from the top to the bottom of the baffles, but with the upper edge of the other end portion being curved downwardly at a rate much greater than the rate of recession from the outlet end and being entirely cut away and spaced from the adjacent casing end.

8. A gas purifier comprising an elongated casing having a gas outlet at a remote distance from one end and a gas inlet extending along one side of said casing, said inlet having purifying means mounted therein, and means for retarding the flow of gas mounted in said casing, said means comprising an inner passageway, the upper edge of each of the side walls of said passageway being spaced away from the top wall so as to form a slot which, at the end opposite said outlet, increases in width at a materially greater rate than the rate of increase in distance from the end of the wall adjacent the said outlet.

9. A fluid separator comprising an elongated passageway, said passageway having an outlet, and an elongated inlet extending from the outlet end of said passageway towards the other end, the width of said inlet increasing as it recedes from the outlet and at a greater rate at certain points remote from the outlet than at a point adjacent the outlet.

10. A gas purifier comprising an elongated casing having an inner passageway, a gas outlet remote from one end and gas purifying means extending along one side of said casing, and means for retarding the flow of gas mounted in said passageway between said outlet and said purifying means, said retarding means comprising plates forming an inner passageway opening into said outlet, certain of said plates providing an elongated slot opening into said passageway, the slot varying in width as it recedes from the outlet, the rate of change in width per unit of length being greater at a certain portion of the slot than at another portion.

11. A gas purifier comprising an elongated casing having a gas outlet adjacent one end and a gas inlet extending along one side of said casing, said inlet having purifying means mounted therein, and means for retarding the flow of gas mounted in said casing, said means comprising plates forming an inner passageway, certain of said plates providing an elongated slot opening into the passageway, the slot varying in width as it recedes from the outlet, the rate of change in said width per unit of length being greater at certain portions of the inlet than in others, said slot being positioned in the upper portion of said passageway.

12. A gas separator comprising a casing having a gas outlet remote from one end, gas purifying means mounted in said casing, and gas flow retarding means mounted in said casing between said purifying means and said outlet, said means arranged to retard the flow of gas at points adjacent said outlet more than at more remote points and with reference to two certain points the retardation is greater at the point nearer the outlet than inversely as the distances of the two points from the outlet.

In testimony whereof, I hereunto set my hand.

ABRAHAM L. MENZIN.